(12) United States Patent
Shen et al.

(10) Patent No.: US 9,278,346 B2
(45) Date of Patent: Mar. 8, 2016

(54) HYDRODEOXYGENATION CATALYST

(75) Inventors: Wenqin Shen, Louisville, KY (US);
Alguo Liu, Orange, TX (US); Wayne Turbeville, Crestwood, KY (US)

(73) Assignee: CLARIANT CORPORATION, Louisville, KY (US)

( * ) Notice: Subject to any disclaimer, the term of this patent is extended or adjusted under 35 U.S.C. 154(b) by 399 days.

(21) Appl. No.: 13/557,475

(22) Filed: Jul. 25, 2012

(65) Prior Publication Data

US 2014/0031546 A1  Jan. 30, 2014

(51) Int. Cl.
*B01J 23/44* (2006.01)
*B01J 23/42* (2006.01)
(Continued)

(52) U.S. Cl.
CPC .............. *B01J 35/002* (2013.01); *B01J 21/066* (2013.01); *B01J 23/14* (2013.01); *B01J 23/28* (2013.01); *B01J 23/36* (2013.01); *B01J 23/42* (2013.01); *B01J 23/44* (2013.01); *B01J 23/462* (2013.01); *B01J 23/464* (2013.01); *B01J 23/466* (2013.01); *B01J 23/468* (2013.01); *B01J 23/63* (2013.01); *B01J 23/6482* (2013.01); *B01J 23/6484* (2013.01); *B01J 23/6486* (2013.01); *B01J 23/6525* (2013.01); *B01J 23/6527* (2013.01); *B01J 23/6562* (2013.01); *B01J 23/6567* (2013.01); *B01J 23/72* (2013.01); *B01J 23/75* (2013.01); *B01J 23/755* (2013.01); *B01J 23/83* (2013.01); *B01J 23/8472* (2013.01); *B01J 23/8474* (2013.01); *B01J 23/8476* (2013.01); *B01J 23/882* (2013.01); *B01J 23/883* (2013.01); *B01J 23/888* (2013.01); *B01J 23/8892* (2013.01); *B01J 23/8896* (2013.01); *B01J 37/0009* (2013.01); *B01J 37/0207* (2013.01); *B01J 37/0242* (2013.01); *C10G 3/47* (2013.01); *C10G 3/48* (2013.01); *C10G 3/52* (2013.01); *C10L 1/04* (2013.01); *C10G 2300/1011* (2013.01); *C10G 2300/1014* (2013.01); *C10G 2300/1018* (2013.01)

(58) Field of Classification Search
None
See application file for complete search history.

(56) References Cited

U.S. PATENT DOCUMENTS 6,602,481 B1   8/2003   Ohtsuka et al.
7,067,455 B2   6/2006   Chen et al.
(Continued)

FOREIGN PATENT DOCUMENTS

| WO | 9613328 | | 5/1996 |
|---|---|---|---|
| WO | WO2010101636 | * | 3/2010 |
| WO | WO2010101636 | * | 9/2010 |

OTHER PUBLICATIONS

Development of the acidity of zirconia-supported niobia catalysts. Thomas Onfroy et al. Catalysis Letters. vol. 89, No. 102 Jul. 2003.*
(Continued)

*Primary Examiner* — Melvin C Mayes
*Assistant Examiner* — Colette Nguyen

(57) ABSTRACT

A hydrodeoxygenation catalyst comprises a metal catalyst, an acid promoter, and a support. The metal catalyst is selected from platinum, palladium, ruthenium, rhenium rhodium, osmium, iridium, nickel, cobalt, molybdenum, copper, tin, or mixtures thereof. The support is a promoted-zirconium material including texture promoters and acid promoters. The hydrodeoxygenation catalyst may be used for hydrodeoxygenation (HDO) of sugar or sugar alcohol in an aqueous solution. In one embodiment the HDO catalyst may be used for HDO of fatty acids such as fatty acid methyl esters (FAME), triglycerols (in plant oil and animal fat), pyrolysis oil, or lignin. The hydrodeoxygenation catalyst for fatty acid process does not require the use of an acid promoter, it is optional.

14 Claims, 7 Drawing Sheets

(51) Int. Cl.

| | |
|---|---|
| *B01J 35/00* | (2006.01) |
| *B01J 37/02* | (2006.01) |
| *B01J 23/847* | (2006.01) |
| *B01J 23/889* | (2006.01) |
| *B01J 21/06* | (2006.01) |
| *B01J 23/14* | (2006.01) |
| *B01J 23/28* | (2006.01) |
| *B01J 23/36* | (2006.01) |
| *B01J 23/46* | (2006.01) |
| *B01J 23/63* | (2006.01) |
| *B01J 23/648* | (2006.01) |
| *B01J 23/652* | (2006.01) |
| *B01J 23/656* | (2006.01) |
| *B01J 23/72* | (2006.01) |
| *B01J 23/75* | (2006.01) |
| *B01J 23/755* | (2006.01) |
| *B01J 23/83* | (2006.01) |
| *B01J 23/882* | (2006.01) |
| *B01J 23/883* | (2006.01) |
| *B01J 23/888* | (2006.01) |
| *B01J 37/00* | (2006.01) |
| *C10L 1/04* | (2006.01) |
| *C10G 3/00* | (2006.01) |

(56) References Cited

U.S. PATENT DOCUMENTS

| | | | |
|---|---|---|---|
| 7,384,987 | B2 | 6/2008 | Iordache-Cazana et al. |
| 8,017,818 | B2 | 9/2011 | Cortright et al. |
| 8,075,642 | B2 | 12/2011 | Dumesic et al. |
| 2008/0269519 | A1* | 10/2008 | Miller ............... B01J 27/188 |
| | | | 562/519 |
| 2011/0046423 | A1 | 2/2011 | Sughrue et al. |
| 2011/0160482 | A1 | 6/2011 | Nagaki et al. |
| 2011/0301021 | A1 | 12/2011 | Liu et al. |
| 2012/0167876 | A1* | 7/2012 | Qiao ............... C10G 1/06 |
| | | | 127/37 |

OTHER PUBLICATIONS

Zakzeski, Joseph, et al., "The Catalytic Valorization of Lignin for the Production of Renewable Chemicals" Chem. Rev., 110, 3552-3599 (2010).

Barton, David, et al., "Structural and catalytic characterization of solid acids based on zirconia modified by tungsten oxide," J. Catal., 181, 57-72 (1999).

Onfroy, T., et al., "Development of the acidity of zirconia-supported niobia catalysts,", Catal. Letter, 89, 15-19 (2003).

Samaranch, B., et al., "Study of the structure, acidic, and catalytic properties of binary mixed oxide $MoO_3$—$ZrO_2$ systems", Chem. Matt., 18, 1581-1586 (2006).

Huber, G.W., et al., "Renewable Alkanes by Aqueous-Phase Reforming of biomass-Derived Oxyhenates," Angew. Chem. Int. Ed., 43, 1549-1551 (2004).

Zhao, Chen, et al., "Highly Selective Catalytic Conversion of Phenolic Bio-Oil to Alkanes," Angew. Chem. Int. Ed. 48, 3987-3990 (2009).

Zhao, Chen, "Hydrodeoxygenation of bio-derived phenols to hydrocarbons using RANEY® Ni and Nafion/$SiO_2$ Catalysts," Chem. Commun., 46, 412-414 (2010).

Sud-Chemie Inc. Brochure Catalysts for Oil Refining 2006.

Sud-Chemie Inc. General Catalogue 2007.

International Search Report and Written Opinion of the International Searching Authority with mailing date of Nov. 6, 2013.

* cited by examiner

HYDRODEOXYGENATION CATALYST

BACKGROUND

Compared to crude oil, biomass feedstocks have intrinsically high oxygen contents ranging from 6% for nature oil and fats to more than 50% for carbonhydrates. Conversion of these feedstocks to high value chemicals or "drop in" fuels without excessive sacrifice of carbon by decarboxylation/decarbonylation requires hydrodeoxygenation (HDO) as a mandatory process step. The HDO process is similar to the hydrotreating process which has been widely applied in petroleum refinery. It removes oxygen as "impurity" in the form of water by consumption of hydrogen.

Renewable diesels from HDO of plant oil and animal fats have been commercially produced by using conventional NiMo- and CoMo-based hydrotreating catalysts on zeolites or silica-alumina. The success can be attributed to the relatively low oxygen content, less impurities in the feedstocks, and importantly, the process design and optimization (U.S. Pat. No. 7,955,401, U.S. Publication No. 2010/0331586). These conventional hydrotreating catalysts were easily deactivated once be applied to hydrodeoxygenation of biomass-derived feedstocks. The fast deactivation might be due to the active oxygen functionalities, impurities, coke formation, water poisoning and the leaching of the silica-alumina based support. Moreover, the co-feed of sulfur compounds to maintain the activity of the conventional hydrotreating catalysts causes the contamination of downstream product (Chem. Rev., 110, 2010, 3552).

A process for preparing liquid fuels and chemical intermediates from biomass-derived hydrocarbons is described in U.S. Publication No. 2009/0255171. The method includes the steps of reacting in a single reactor an aqueous solution of sorbitol or glycerin in the present of a Pt—Re/C catalyst to yield a self-separating three-phase product stream comprising a vapor phase, an organic phase containing linear and/or cyclic mono-oxygenated hydrocarbons and an aqueous phase. In this process, the carbon exiting the reactor from sorbitol conversion consists primarily of alkanes, oxygenated compounds (C4-C6 alcohols, ketones, acids, and hetero-cylics), and $CO_x$ (contributing to about 20-30% of total carbon in the product). Pt is regarded to be active for steam reforming and water-gas shift reaction and Re is regarded to be active for dehydration and C—O bonds cleavage. The process involves aqueous phase reforming reaction (APR). No additional hydrogen is required to co-feed with sugar alcohol. However, the carbon lost in the gas phase as $CO_2$ is about 15% to 20%.

Due to the wide range of oxygen content and the nature of the biomass-derived feedstocks, for example: sugar and sugar alcohols, plant oil/animal fats, bio-crude from biomass pyrolysis or hydrothermal process, and lignin, the HDO process conditions vary a lot. In some cases, it requires operation under aqueous reaction condition, for example, the sugar and sugar alcohols HDO reaction. Therefore, water tolerance is a desired feature for the HDO catalysts to handle biomass-derived feedstocks.

Methods for preparing of polyacid-promoted zirconia extrudates which are hydrothermal stable in aqueous phase applications are described in U.S. publication No. 2011/0301021 which is hereby incorporated in its entirety. The zirconyl-promoter precursor is extruded in absence of any binder, extrusion aid or stabilizing agent. The calcined support comprises more than 85% tetragonal phase of zirconium oxide stabilized by polyacid promoter.

BRIEF SUMMARY

A hydrodeoxygenation catalyst comprises a metal catalyst and a hydrothermally stable support with tunable acid density and strength. The metal catalyst is selected from platinum, palladium, ruthenium, rhenium, rhodium, osmium, iridium, nickel, cobalt, molybdenum, copper, tin, or mixtures thereof. The support is a promoted-zirconium material.

The hydrodeoxygenation catalyst may be used for HDO of sugar or sugar alcohol in an aqueous solution. In one embodiment the HDO catalyst may be used for HDO of fatty acids such as fatty acid methyl esters, fatty acids, plant oil, animal fat, pyrolysis oil, or lignin.

These and other objects and advantages shall be made apparent from the accompanying drawings and the description thereof.

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure.

DETAILED DESCRIPTION

The HDO catalyst is bifunctional catalyst comprising a metal catalyst for hydrogenation and acidic support for dehydration and hydrolysis. The acidic support is built on a hydrothermal stable support with tunable acid density and strength by adding various acid promoters. In one embodiment the HDO catalyst may be used for HDO of sugar, sugar alcohols in aqueous phase reaction, HDO of plant oil/animal fat, HDO of lignin, HDO of bio-crude oils from pyrolysis and other hydrothermal treatment. In another embodiment the HDO catalyst may be used for HDO of Fischer-Tropsch synthetic hydrocarbons which contains oxygenates, for example, free fatty acids and free fatty alcohols.

In one embodiment the support contains at least two types of promoters: a textural promoter and an acid promoter. The hydrothermal stable Cr promoted zirconia support prepared according to US publication 2011/0301021 is an example of a textural promoter which helps to maintain the physical strength and the tetragonal phase. This hydrothermally stable support is further promoted by Nb, W, Mo, and combinations thereof to tune the acid strength and density for HDO for a variety of biomass derived feedstocks.

Figure 11:
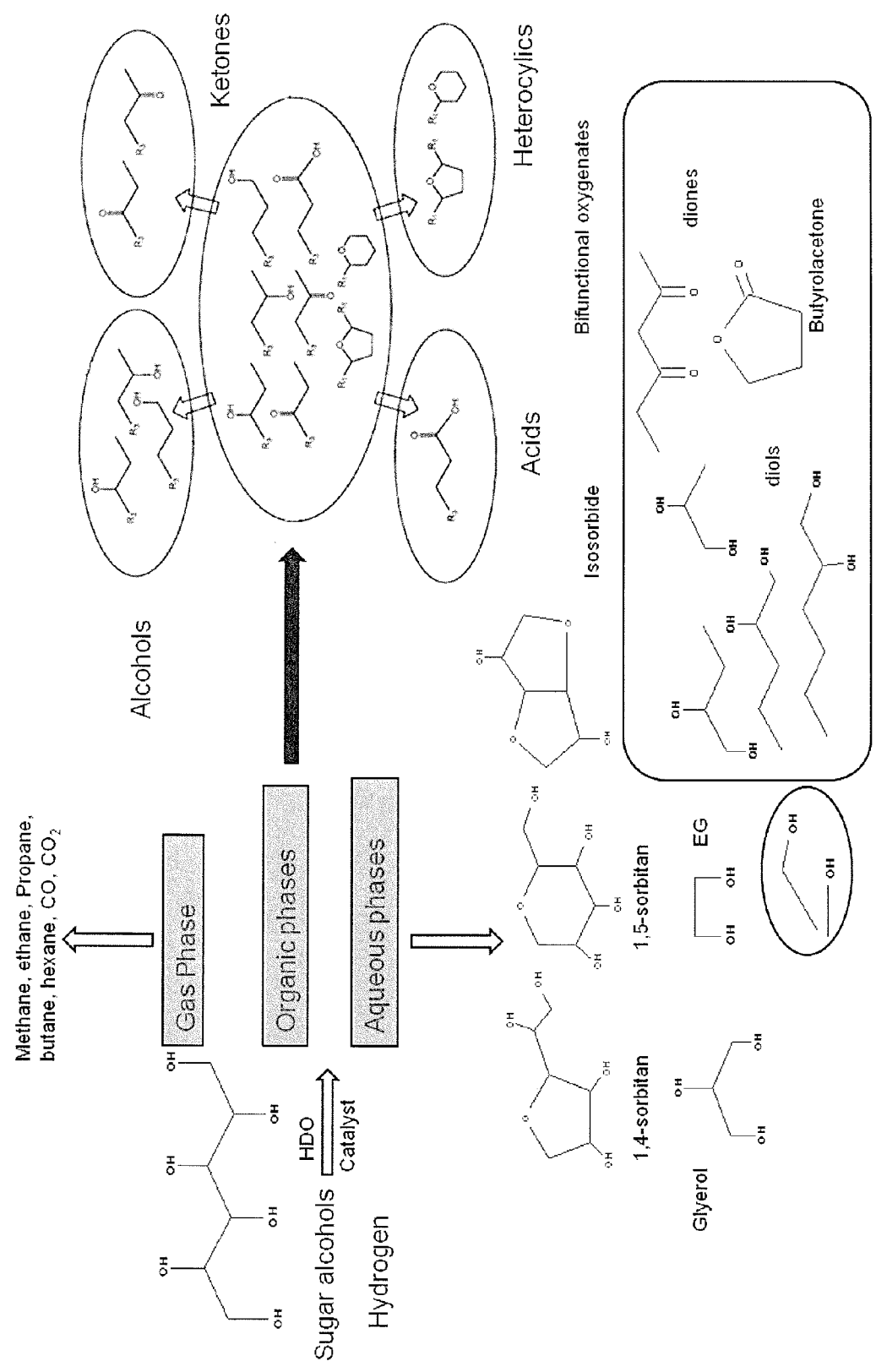
FIG. 11 shows the potential product from aqueous phase HDO of sugar alcohols.

HDO of sugar alcohols (low temperature hydrogenation product of sugars) by sequential dehydration-hydrogenation leads to straight chain alkanes. However, due to the side reactions of cracking, hydrogenolysis, decarbonylation, dehydrogenation, retro-aldol and so on, aqueous phase HDO of sugar alcohols generates hydrophobic monofunctional oxygenates such as alcohols, ketones, heterocylics, carbonxylic acids and hydrophilic oxygenated compounds. Among these compounds, sorbitans and isosorbide (dehydration products), diols, diones, heterocyclics with more than two oxygen functionalities, methanol, and ethanol remain in the aqueous phase. The gas products are mainly C1-C6 alkanes, $CO_2$, and CO. Examples of potential product from aqueous phase HDO of sugar alcohols are shown in FIG. 11.

The HDO of sugar alcohols consumes external hydrogen and minimizes the carbon loss to the gas phase as CO and $CO_2$ compared to the APR-HDO (Aqueous phase reforming-hydrodeoxygenation) process, which consumes hydrogen generated in-situ. It also minimizes the formation of humins and coke, which deactivates the catalyst. The added hydrogen may be produced from biomass origin, for example, APR, gasification followed by water gas shift reaction.

Conducting HDO under high hydrogen pressure helps to decrease the reforming reaction, which lowers the carbon loss in the gas phase.

The efficiency of an HDO catalyst for conversion of sorbitol is evaluated based on the amount of hydrophobic oil phase products and the alkanes (C1-C6) are in the gas phase. In other words, the total reduction of oxygen in the products (excluding water) are related to the HDO efficiency of the catalyst. To simplify the measurement of the efficiency of the catalyst, the carbon selectivity to monofuctional oxygenates (MO) and hexane is measured under the same conditions to qualify the HDO efficiency, especially at lower reaction temperatures and relatively higher liquid hour space velocity (LHSV).

An advantage of the HDO catalyst compared to the catalysts used in APR-HDO reactions is the improved carbon selectivity. The HDO catalysts can generate significantly less $CO_2$ (such as less than 10%) compared to APR-HDO reactions (about 20-30%). This improvement reduces the loss of carbon to an undesired product.

Figure 2:
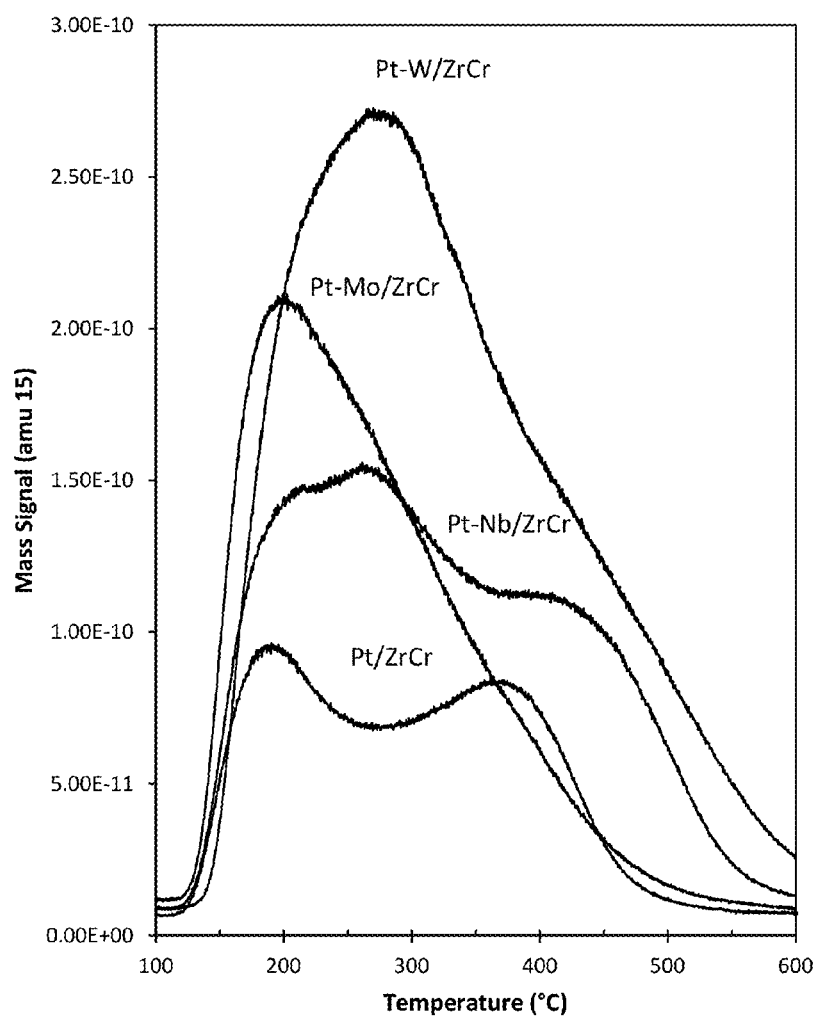
FIG. 2 shows $NH_3$-TPD profiles of prepared HDO catalysts.

In one embodiment water stable acidic support may be impregnated with Nb to improve their HDO performance. Through the use of the Nb promoter, the acid density of the support increases from 103.8 umol/g for the unpromoted ZrCr support to 158.8 umol/g. The acid strength of Pt—Nb/ZrCr is also increased as shown in FIG. 2. With the same amount of precious metal Pt loading, Pt—Nb/ZrCr generates a more hydrophobic oil phase product than Pt/ZrCr, a non-acid promoted catalyst, under the same operating conditions. The oil products for Pt—Nb/ZrCr are also much more transparent compared to the products of Pt/ZrCr. In addition, the conversion of sugar alcohols is higher for Pt—Nb/ZrCr compared to Pt/ZrCr under the same operating conditions, especially, under lower reaction temperatures and less hydrogen supply.

In another embodiment W and Mo may be used to promote the support. The acid density for W and Mo promoted support increases from 103.8 umol/g for Pt/ZrCr to 158.8 umol/g for Nb promoted support (Pt—Nb/ZrCr) further to 171.2 for Pt—Mo/ZrCr to 269.7 umol/g for Pt—W/ZrCr. However, molybdenum only promotes the acid sites with lower acid strength. Pt—W/ZrCr has the highest acid density and strength in all the three promoted catalysts and it is the most active HDO catalyst among others. At 265° C. with a LHSV of 0.25 $h^{-1}$ and GHSV of 800 $h^{-1}$, Pt—W/ZrCr converted 99.5% sorbitol into hexane (55% carbon selectivity) with the balance being other light hydrocarbon gas. The Mo promoted catalyst is less active than Nb promoted catalyst under the same above mentioned operating conditions. However, it did show high selectivity to primary hexanol and hexane compared to Pt—Nb/ZrCr and Pt—W/ZrCr.

The HDO catalysts are hydrothermally stable in aqueous phase reaction. No leaching of composition was observed. The crush strength of the spent catalyst is the same as the fresh catalyst. Carbon was detected in the spend HDO catalysts, which might be due to adsorbed organic species. Pt—Mo/ZrCr had very high carbon content in the spent catalyst (10.4%), which contributes to its deactivation in sorbitol HDO after 244 hours on stream (HOS). Pt—Nb/ZrCr and Pt—W/ZrCr are deemed to be stable without any deactivation observed after 703 HOS and 413 HOS, respectively.

Due to acid density and strength differences, the catalytic performances varied when Nb, W and Mo were used to promote the HDO catalyst. The acidic properties can be finely tuned by varying the promoter, the promoter amount, the preparation method (for example, mixing method, treatment temperature, and so on), and using combinations of different types of promoters. Thus the HDO catalyst may be optimized for use with different feedstocks.

The HDO catalyst may be used with a variety of feed stocks such as: free fatty acids, fatty acid methyl esters (FAME), triglycerol, depolymerized lignin, and bio-crude oil from pyrolysis or hydrothermal treatment. In one embodiment, Pt—Nb/ZrCr catalyst is able to completely convert nonanoic acid (NA) into nonanol and further into nonane in a three successive HDO run at 280° C. for 5 to 6 hours under 100 bar hydrogen. In another embodiment, Pt—Nb/ZrCr showed 99.7% conversion of FAME derived from Alga oil with the straight chain hydrocarbon yield of 90.1%. The reaction pathway for FAME HDO is through decarbonylation/decarboxylation ($DeCO_x$) along with hydrogenation/dehydration/hydrogenation reactions. $DeCO_x$ contributes to the carbon loss in biomass derived feedstocks by producing CO and $CO_2$.

The hydrodeoxygenation catalyst comprises a metal catalyst, an acid promoter, and a support. The metal catalyst is selected from platinum, palladium, ruthenium, rhenium rhodium, osmium, iridium, nickel, cobalt, molybdenum, copper, tin, or mixtures thereof. The support is a promoted-zirconium material. The metal catalyst contributes to hydrogenation, hydrogenolysis, decarbonylation, and decarboxylation in the HDO process. The acidic support contributes to dehydration in the HDO process. The acidic support may also contribute to hydrolysis to break down biomass molecules into smaller molecules. The combination of the two allows the process to deoxygenate and hydrogenate the oxygenated starting materials.

The metal catalyst may be platinum, palladium, ruthenium, rhenium, rhodium, osmium, iridium, nickel, cobalt, molybdenum, copper, tin, or mixtures thereof. In one embodiment the metal catalyst is platinum or palladium. In another embodiment the metal catalyst is platinum. In another embodiment the metal catalyst is palladium.

The amount of metal catalyst in the hydrodeoxygenation catalyst may vary. In one embodiment it may be about 0.01% to about 20% by weight; about 0.5% to about 10%; about 0.5% to about 5%; about 0.5% to about 2% by weight, or about 0.5% to about 1% by weight. The weight percent of the metal catalyst may be controlled by adjusting the amount of metal catalyst precursor used in relation to the amount of the promoted support. The metal catalyst precursor may be for example $Pt(NH_3)_4(NO_3)_2$; $Pt(NH_3)_4Cl_2 \cdot H_2O$; $(NH_4)_2PtCl_4$; $H_2PCl_6 \cdot 6H_2O$, other metal coordination complexes, or metal salts.

The hydrodeoxygenation catalyst may be formed by adding the metal catalyst precursor to the promoted-zirconium material by the conventional incipient wetness method or by the impregnation method, or any other method to disperse Pt onto the support effectively. The incipient wetness method involves dropping the catalyst precursor solution onto the carrier until completely wets the carrier followed by drying and calcination. In other words, the volume of the precursor solution consumed is equal to the total pore volume of carrier. In order to achieve the desired the loading, the above procedure may be repeated several times. The impregnation method involves placing the support in a solution containing excess dissolved catalyst precursor with heat and stirring. The support is removed from the solution and is then dried and calcined. In one embodiment, the metal catalyst precursor is dissolved in a solvent (one example is water) prior to adding to the promoted-zirconium material. The wet materials are dried followed by heating at a controlled rate to a temperature of about 450° C. for calcining the material. The HDO catalyst may be further activated with hydrogen in-situ or ex-situ.

Acid Promoter

The acid promoter contributes mainly to dehydration, hydrolysis, or both in the HDO process. The acid promoter can increase the acidity of the support and create additional acid sites. In one embodiment the acid promoter is selected from tungsten, niobium, molybdenum, cerium, manganese, vanadium, rhenium, and tantalum. The acid promoter may be a combination of more than one metal. In another embodiment the acid promoter is selected from tungsten, niobium, and molybdenum. In another embodiment the acid promoter is niobium.

In one embodiment the amount of acid promoter may be from about 0.1% to about 99% by weight of the support. In another embodiment the amount of acid promoter may be from about 1% to about 50%; about 1% to about 25%; about 2% to about 15%; or about 5% to about 10%; by weight of the support.

The acid promoter is typically added to the support by the incipient wetness method or impregnation method which is then followed by the addition of the active metal(s). The support here is typically referred to the shaped support with crush strength above 1.5 lb/mm. The acid promoter is dissolved in solvent, typically, in water, and added to the support by incipient wetness or impregnation method, or any other method to effectively disperse promoter into the support. The mixture is then dried and followed by calcinations at high temperature. The process may be repeated to add additional acid promoter to the support. In another embodiment, the acid promoter is added by physically mixing the promoters with the support before extrusion and calcinations. In another embodiment, the acid promoter is added by precipitation with base into the support slurry followed by filtration, dry, extrusion, calcination. The acid promoter precursors are water soluble salts, metal oxides, metal hydroxides. In one embodiment, the acid promoter precursors are ammonia niobate oxalate, ammonia metatungstate hydrate, ammonium molybdate tetrahydrates. In another embodiment, the acid promoter precursor is niobic acid, tungstic acid.

Changing the acid promoter, the amount, and the calcination temperature, and/or the combinations of acid promoters will change the number of acid sites and the acid strength of the catalyst support. The acidic support is a hydrothermally stable solid acid, which may be applied independently in any reaction using solid acid as catalyst, especially in the reactions which involve water as either a reactant or a product, for example, dehydration, hydrolysis, esterification, Friedel-Crafts reaction as so on.

Support

The support is a promoted-zirconium material. The zirconium may be selected from zirconium or zirconyl halides, zirconium or zirconyl nitrates, or zirconyl organic acids, and combinations thereof. The zirconium compounds may comprise a variety of materials, including zirconium and zirconyl in salt forms of halides such as $ZrCl_4$ or $ZrOCl_2$; nitrates such as $Zr(NO_3)_2 \cdot 5H_2O$ or $ZrO(NO_3)_2$, and organic acids such as $ZrO(CH_3COO)_2$. In one embodiment the zirconium material is $ZrO_2$. In solution, zirconium can be in a form of zirconyl ($ZrO^{2+}$) or zirconium ion ($Zr^{4+}$ or $Zr^{2+}$) that may be obtained by dissolving corresponding salts in water.

In one embodiment the zirconium material is $ZrO_2$ (zirconium hydroxide) or zirconium carbonate.

The zirconium polyacid promoted material may be a Group 6 metal comprising chromium (Cr), tungsten (W), and molybdenum (Mo) in oxide or acid form(s) that form a polyacid after being dissolved in a water solution. In one embodiment, the polyacid is chromium oxide. In another embodiment the polyacid may be selected from $CrO_3$, $Cr_2O_3$, and combinations thereof. In another embodiment, the polyacid promoter material comprises $Cr^{6+}$, as may be found in $CrO_3$. In another embodiment the polyacid promoter material is tungsten oxide. In another embodiment, the polyacid promoter material may be selected from phosphoric acid, sulfuric acid, acetic acid, citric acid and combinations thereof.

One embodiment for preparing a support containing zirconium oxide ($ZrO_2$) involves preparing a zirconium compound and a polyacid promoter material and then mixing these compounds in acidic conditions having a pH ranging from about 0.01 to about 4. A base solution may be added to precipitate of the desired support. The base solution may include aqueous ammonia, aqueous sodium hydroxide, or other aqueous basic solutions for adjusting the pH conditions to yield a zirconium and promoter precipitate. In another embodiment, the polyacid promoter material is initially dissolved in a base solution, such as ammonia hydroxide, followed by mixing with the zirconium compound.

The amount of polyacid in the support may range from about 0.1% to about 50% by weight of the total support mass. In one embodiment the polyacid may range from about 1% to about 40%; about 2% to about 30%; about 2% to about 25%; about 4% to about 15%; or about 5% to about 10% by weight of the total support mass.

In one embodiment, the zirconium-promoter precursor or only the precipitated zirconium is dried until a loss of ignition ("LOI") is achieved in a range between about 60 wt. % to about 70 wt. %. As used herein, LOI may be understood as the weight loss percentage by ignition of the material at approximately 480° C. for approximately two hours. In other embodiments, the zirconium-promoter precursor or the precipitated zirconium is dried until a LOI of about 64 wt. % to 68 wt. % is achieved, or about 65 wt. % to 68 wt. %.

In the various embodiments, the zirconium-promoter may be dried to achieve a mixture that is suitable for extrusion without any binder(s), extrusion aid(s), or stabilizing agent(s). In other words, the zirconium-promoter precursor is dried to be capable of forming a shape suitable for a finished catalyst or catalyst support in the absence of any stabilizing agent, binder, or extrusion aid. The following compounds have been described as a stabilizing agent, binder, or extrusion aid, and all of these compounds are absent in one or more embodiments described in this application: silicon oxide, yttrium oxide, lanthanum oxide, tungsten oxide, magnesium oxide, calcium oxide, cerium oxide, other silicon compounds, silica-alumina compounds, graphite, mineral oil, talc, stearic acid, stearates, starch, or other well-known stabilizing agent, binder or extrusion aid.

Forming the dried zirconium-promoter precursor into any shape suitable for a finished catalyst or catalyst support/carrier maybe done by any forming processes that are well known in the art. In one embodiment, the dried zirconium-promoter precursor is extruded. A screw extruder, press extruder, or other extrusion devices and/or methods known in the art may be used. Alternatively, the dried zirconium-promoter precursor may be pressed such as by tabletting, pelleting, granulating, or even spray dried, provided the wetness of the dried zirconium-promoter precursor is adjusted for the spray-drying material. Optionally, the extruded zirconium-promoter precursor may be dried at moderate temperatures (e.g., up to about 120° C.) for a moderate period of time (e.g., typically about 1 to 5 hours) after being formed.

The extruded or other shaped catalyst or catalyst support may be calcined at temperatures ranging from about 300° C. to 1000° C. for approximately 2 to 12 hours, and preferably from about 400° C. to 700° C. for approximately 3 to 5 hours. In one embodiment, an extruded chromium-promoted zirconium oxide precursor is calcined at about 600° C. for approximately three hours. Alternatively, an extruded chromium-promoted zirconium oxide precursor may be calcined at a ramp of 1 K/minute to about 600° C. and dwell for approximately 3 hours. In another embodiment, an extruded polyacid-promoted zirconium precursor is calcined at about 300° C. to 1000° C., or at about 400° C. to 700° C., or at about 500° C. to 600° C. for approximately 2 to 12 hours.

Using the various method embodiments described above, the polyacid-promoted zirconium oxide catalyst support has a crystalline structure of one or more of the monoclinic, tetragonal, cubic and/or amorphous phases as determined by well-known powder x-ray diffraction (XRD) techniques and devices. For example, see "Introduction to X-ray Powder Diffraction," R. Jenkins and R. L Snyder, Chemical Analysis, Vol. 138, John Wiley & Sons, New York, 1996. Typically, the tetragonal phase of zirconium oxide may be determined by measuring the intensity of a sample at a d-spacing of 2.97 angstroms, while the monoclinic phase is measure at a d-spacing of 3.13 angstroms. In other embodiments, the catalyst support may be further characterized as comprising about 50 wt. % to 100 wt. % tetragonal phase of zirconium oxide as its crystalline structure. In another embodiment, the catalyst support may be further characterized as comprising 0 to 50 wt. % monoclinic phase of zirconium oxide. Alternatively, the crystalline structure may comprise above 80 wt. % tetragonal phase of zirconium oxide, or about 85 wt. % tetragonal phase of zirconium oxide.

For a catalyst support comprising a Zr/Cr composition, the more chromium used in the process, the more tetragonal phase crystalline structure is achieved as product. For example, a 4:1 molar ratio yields almost 100% tetragonal phase of zirconium oxide. An 8:1 molar ratio yields almost 100% tetragonal phase of zirconium oxide. At a 12:1 molar ratio, the crystalline structure is approximately 85 wt. % to 90 wt. % tetragonal phase and approximately 15 wt. % to 10 wt. % monoclinic phase of zirconium oxide.

The polyacid-promoted zirconium oxide catalyst support as described above may have a crush strength in a range between 67 N/cm (1.5 lb/mm) and 178 N/cm (4.0 lb/mm). In one embodiment, the catalyst or catalyst support has a minimum crush strength of at least 45 N/cm (1 lb/mm) or at least 90 N/cm (2 lb/mm). The crush strength of the catalyst support may be measured using ASTM D6175-03 (2008), Standard Test Method for Radial Crush Strength of Extruded Catalyst and Catalyst Carrier Particles.

In other embodiments, the polyacid-promoted zirconium oxide catalyst support may have a surface area as measured by the BET (Stephen Brunauer, Paul Hugh Emmett, and Edward Teller) method in a range between 20 $m^2/g$ and 150 $m^2/g$. In one embodiment, the zirconium oxide catalyst support may have a surface area in a range between 80 $m^2/g$ and 150 $m^2/g$, and preferably about 120 $m^2/g$ and 150 $m^2/g$.

The polyacid-promoted zirconium oxide catalyst support may also have a pore volume in a range between 0.10 cc/g and 0.40 cc/g. Generally, for initial molar ratios between 4:1 and 16:1, the pore volume consistently yields values in a range between 0.15 cc/g and 0.35 cc/g. For initial molar ratios approximately 8:1, the pore volume consistently yields values in a range between 0.18 cc/g and 0.35 cc/g.

Aqueous HDO

The hydrodeoxygenation process is a process to remove oxygen from feedstock materials in the form of water by consuming hydrogen. It has been found that using a hydrodeoxygenation catalyst comprising a metal catalyst, an acid promoter, and a hydrothermally stable support other than carbon is stable in aqueous phase conditions. The metal catalyst may be selected from platinum, palladium, ruthenium, rhenium rhodium, osmium, iridium, nickel, cobalt, molybdenum, copper, tin, or mixtures thereof. The support is a promoted-zirconium material. The hydrodeoxygenation process may use an aqueous solution of sugar or sugar alcohol as starting material. The process may be carried out under a hydrogen atmosphere above atmospheric pressure. The metal catalyst, the acid promoter, and the promoted-zirconium support are described above.

The pressure of the hydrogen atmosphere helps to suppress the steam reforming reaction which produces carbon monoxide and carbon dioxide gas products. The hydrogen source also suppresses the formation of humins and coke which can increase the lifetime of the hydrodeoxygenation catalyst. In one embodiment the pressure is at least 5 bar, 10 bar, 20 bar, 25 bar, 30 bar, 50 bar, 75 bar, or 100 bar.

The temperature of the aqueous hydrodeoxygenation process is from about 220° C. to about 300° C. In one embodiment the temperature may be from about 230° C. to about 290° C., 240° C. to about 280° C., or 250° C. to about 275° C.

HDO of Fatty Acids

The hydrodeoxygenation process may also be carried out on fatty acids, fatty acid methyl esters (FAME), triglycerols (in plant oil and animal fat), pyrolysis oil, or lignin. The hydrodeoxygenation catalyst for this process comprises a metal catalyst, and a support. The metal catalyst may be selected from platinum, palladium, ruthenium, rhenium rhodium, osmium, iridium, nickel, cobalt, molybdenum, copper, tin, or mixtures thereof. The support is a promoted-zirconium material. The metal catalyst and the promoted-zirconium support are described above. The hydrodeoxygenation for the fatty acid process does not require the acid promoter, it is optional.

In one embodiment the hydrodeoxygenation catalyst additionally comprises an acid promoter. The acid promoter may be selected from tungsten, niobium, molybdenum, manganese, vanadium, rhenium, and tantalum. Additional details about the acid promoter are described above.

The temperature of the hydrodeoxygenation process of fatty acids is from about 200° C. to about 450° C. In one embodiment the temperature may be from about 220° C. to about 425° C., 230° C. to about 415° C., 250° C. to about 400° C., or 250° C. to about 350° C.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art.

EXAMPLES

Example 1

Preparation of Niobium Promoted Zirconium Support

Chromium promoted zirconium support was prepared according to U.S. Publication No. 2011/0301021.

Ammonia niobate oxalate (7.6 g) was measured and dissolved into deionized water (20-30 mL) with slight heat. The solution was dropped into ZrCr support (30 g) with vigorous vibration until the materials were completely wet. The resulting material was dried at 110° C. for 1 h and followed by calcinations at 450° C. for 2 h with a heating ramp rate of 10° C./min. This yielded about 33.6 g Nb—ZrCr support.

Example 2

Preparation of Molybdenum Promoted Zirconium Support

Mo—ZrCr support was made in the same manner as in Example 1, except ammonium molybdate tetrahydrate $((NH_4)_6Mo_7O_{24} \cdot 4H_2O$, 6.12 g) was used in place of the ammonia niobate oxalate. The resulting wet material was dried at 110° C. for 1 h and followed by calcinations at 650° C. for 2 h with a heating ramp rate of 10° C./min.

Example 3

Preparation of Tungsten Promoted Zirconium Support

W—ZrCr support was made in the same manner as in Example 1, except ammonia metatungstate hydrate $((NH_4)_6 H_2W_{12}O_{40} \cdot xH_2O$, 4.5 g) was used in place of the ammonia niobate oxalate. The resulting wet material was dried at 110° C. for 1 h and followed by calcinations at 650° C. for 2 h with a heating ramp rate of 10° C./min.

Characterization of the Promoted Supports

Figure 1:
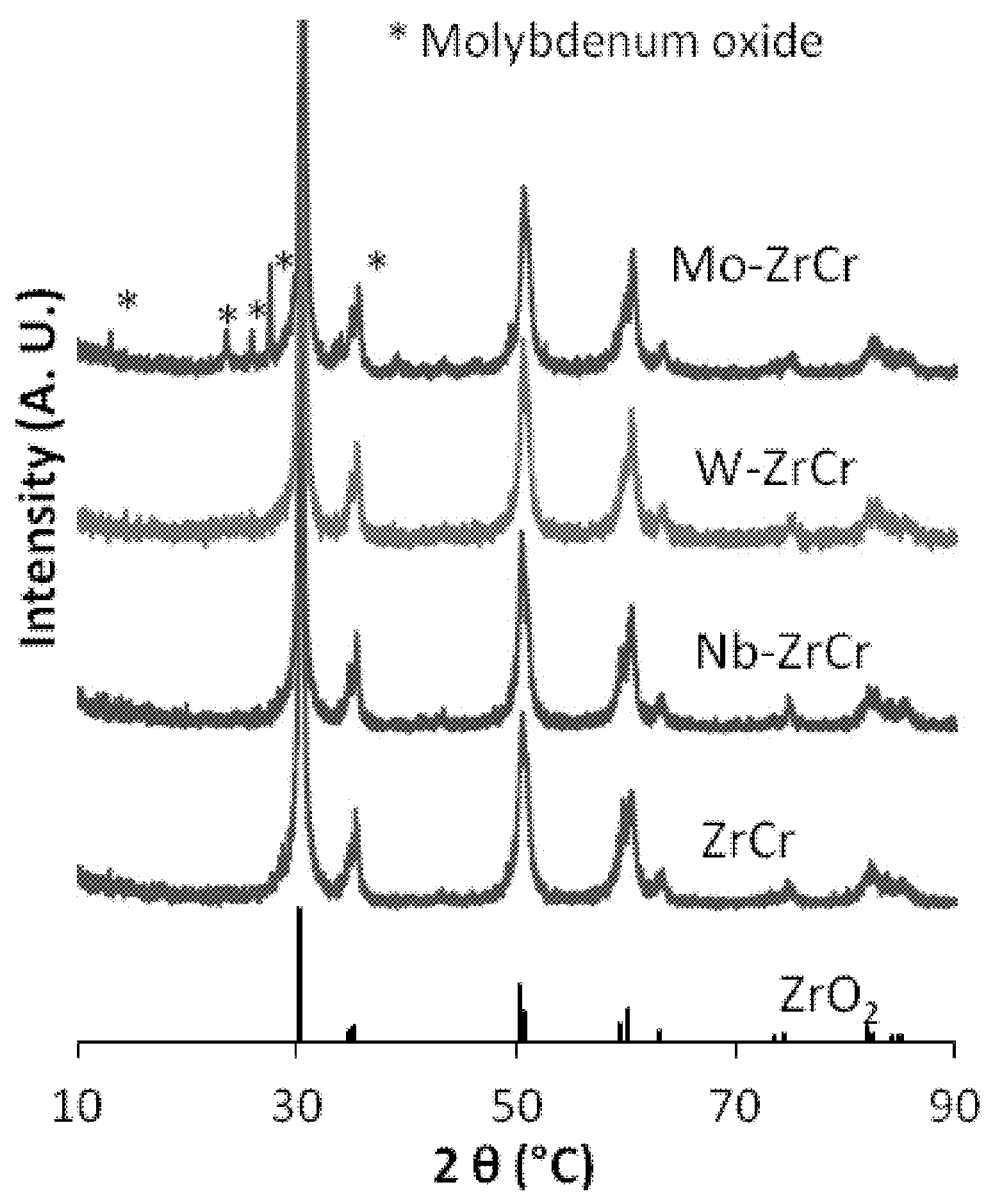
FIG. 1 shows XRD patterns (Cu kα) of acid promoted ZrCr supports. The XRD patterns of a tetragonal ZrCr oxide support were also included for comparison.

The XRD patterns (Cu kα) of the promoted ZrCr supports in FIG. 1 show that Nb and W were well dispersed into ZrCr support, thereof XRD amorphous, while Mo oxides particles were observed. The XRD patterns of a tetragonal zirconium oxide and the ZrCr support were also included for comparison. Cr is a textural promoter to stabilize tetragonal phase of $ZrO_2$.

Example 4

Preparation of HDO Catalyst Pt/ZrCr (Pt: 2 wt. %)

$Pt(NH_3)_4(NO_3)_2$ (0.6 g) was dissolved into 7 mL water with slight heating. The solution was dropped into ZrCr support (15 g). The resulting wet mixture was dried at 110° C. for 1 h and calcined at 400° C. for 2 h and activated in-situ in a flow of hydrogen at 250° C. for 4-8 h.

Example 5

Preparation of HDO Catalyst Pt—Nb/ZrCr (Pt: 2 wt. %)

The catalyst was made by the same procedure in Example 4 except Nb/ZrCr support was used in place of the ZrCr support.

Example 6

Preparation of HDO Catalyst Pt—Mo/ZrCr (Pt: 1 wt. %)

$Pt(NH_3)_4(NO_3)_2$ (0.5 g) was dissolved in 15 mL water with slight heating. The solution was dropped into the Mo/ZrCr support (25 g). The resulting wet mixture was dried at 100° C. for 1 h and calcined at 400° C. for 2 h and activated in-situ in a 250 mL/min hydrogen flow at 250° C. for 4-8 h.

Example 7

Preparation of HDO Catalyst Pt—W/ZrCr (Pt: 1 wt. %)

The catalyst was made by the same procedure in Example 6 except W/ZrCr support was used in place of the Mo/ZrCr support.

$NH_3$-TPD for Acid Sites and Strength Analysis

All the $NH_3$-TPD (temperature programmed desorption) tests were conducted by the same procedure. About 150 mg of catalyst was loaded and pre-reduced at 450° C. for 2 h with a heating ramp rate of 10 K/min. Then, the reduced catalyst was cooled to 100° C. in nitrogen. Ammonia gas flow was next introduced and purged for 20 min to saturate the catalyst sample. The excess ammonia gas was carried away by a nitrogen flow for 30 min. The sample chamber was next heated to 600° C. with a 10 K/min heating ramp rate and maintained for additional 20 min. The gas effluent was monitored by MS detector and the mass fraction of 15 was recorded with time-on-stream (TOS). FIG. 2 shows the ammonia TPD profiles for the prepared HDO catalysts. The acid densities for these catalysts were 103.8 umol/g, 158.8 umol/g, 171.2 umol/g and 269.7 umol/g in the sequence of Pt/ZrCr, Pt—Mo/ZrCr, Pt—Nb/ZrCr and Pt—W/ZrCr. And the acid strength was increased with Nb and W promoted catalyst, especially W promoted catalyst.

Example 8

Sorbitol HDO over Pt—ZrCr and Pt—Nb/ZrCr

Figure 3:
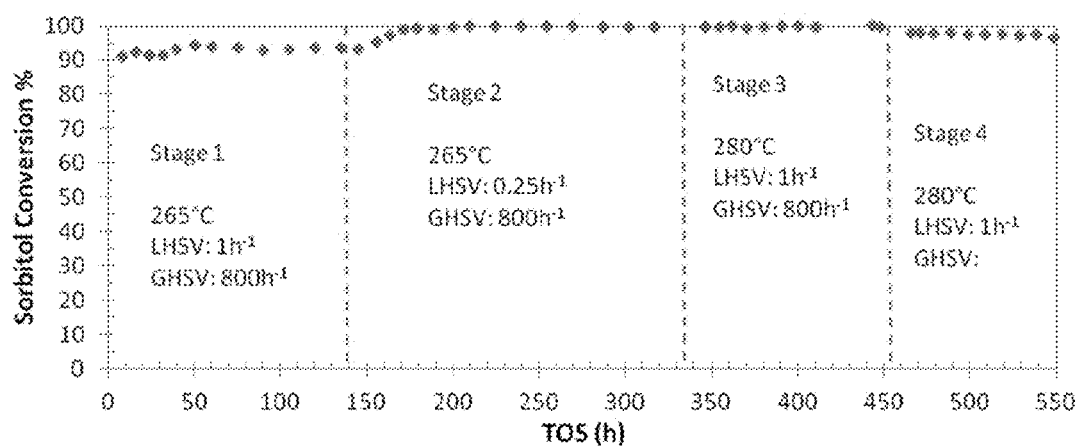
FIG. 3 shows time-on-stream (TOS) sorbitol conversion with the Pt—Nb/ZrCr catalyst for sorbitol HDO operated under different reaction conditions.
Figure 4:
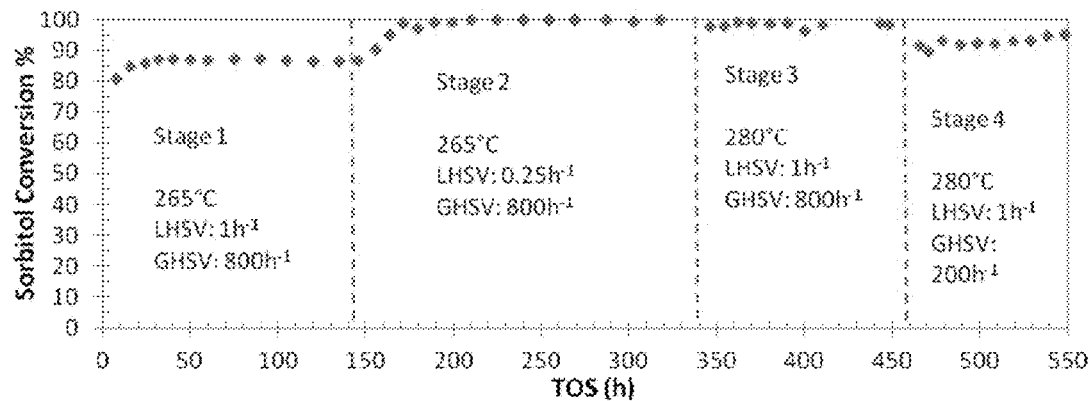
FIG. 4 shows time-on-stream (TOS) sorbitol conversion with the Pt/ZrCr catalyst for sorbitol HDO operated under different reaction conditions.

Pt/ZrCr and Pt—Nb/ZrCr catalysts were evaluated for sorbitol HDO reaction in parallel fixed-bed reactors. The catalyst loadings for both sides were 15 mL with stainless steel (S.S.) ball (Ø3 mm) dilution to 30 mL. The catalysts were activated in-situ before reaction. The feed aqueous solution contained 33 wt. % sorbitol. The test was conducted at 100 bar hydrogen pressure. The catalysts were first tested at 280° C. for 196 h and then stopped. The spent catalyst was flushed with de-ionized water and dried by nitrogen purge. The catalyst was maintained in reactor for 2 month and then reactivated in hydrogen. The testing conditions for sorbitol HDO in the resumed test are summarized in Tables 1 and 2 and FIGS. 3 and 4.

TABLE 1

Summary of the testing conditions for sorbitol HDO over Pt—Nb/ZrCr

| Stage | Reaction T (°C.) | Pressure (bar) | LHSV (h$^{-1}$)/ Pump rate (mL/min) | H$_2$ flow (mL/min)/ GHSV(h$^{-1}$) | Liquid product collecting time (h)# | Oil product (mL) | TOS (h) |
|---|---|---|---|---|---|---|---|
| 1 | 265 | 100 | 1/(0.25) | 200 (800 h$^{-1}$) | 49 | — | 146 |
| 2 | 265 | 100 | 0.25/(0.063) | 200 (800 h$^{-1}$) | 119 | 30.5 | 145 |
| 3 | 280 | 100 | 1/(0.25) | 200 (800 h$^{-1}$) | 75 | 64 | 120 |
| 4 | 280 | 100 | 1/(0.25) | 50 (200 h$^{-1}$) | 48 | 14 | 96 |

TABLE 2

Summary of the testing conditions for sorbitol HDO over Pt/ZrCr

| Stage | Reaction T (°C.) | Pressure (bar) | LHSV (h$^{-1}$)/ Pump rate (mL/min) | H$_2$ flow (mL/min)/ GHSV(h$^{-1}$) | Liquid product collecting time (h)# | Oil product (mL) | TOS (h) |
|---|---|---|---|---|---|---|---|
| 1 | 265 | 100 | 1/(0.25) | 200 (800 h-1) | 49 | — | 146 |
| 2 | 265 | 100 | 0.25/(0.063) | 200 (800 h-1) | 119 | 11 | 145 |
| 3 | 280 | 100 | 1/(0.25) | 200 (800 h-1) | 75 | 14 | 120 |
| 4 | 280 | 100 | 1/(0.25) | 50 (200 h-1) | 48 | 2.5 | 96 |

The liquid products were sampled every 8 to 15 h and analyzed by HPLC for unreacted sorbitol, sorbitan, isosorbide, glycols and ethylene glycol (EG). The gas product was analyzed by GC for hydrocarbons and CO, CO$_2$. The bulk liquid product was collected after steady-state operation at each testing stage. In some reaction conditions, phase separation was observed with oil phase on top and aqueous phase on bottom in bulk liquid product. Both phases were analyzed by total carbon analysis (TOC) and GC/MS. The amount of the desired oil products produced by the Pt—Nb/ZrCr catalyst is much greater than the amount of oil products produced by the Pt/ZrCr catalyst.

In tables 3, 4, and 7, the term "HPLC" is the sum total of the carbon selectivity of the products analyzed by HPLC which includes sorbitans, glycerin, isosorbide and EG. The aqueous cut is the sum total of the carbon selectivity of diols/diones analyzed from GC/MS and the HPLC product which remains in the aqueous phase. The carbon selectivity for gas products is the sum of carbon selectivities for hydrocarbon (C1 to C6) and CO, CO$_2$. The amount of the oil phase (mainly monofunctional oxygenates) was related to the efficiency of deoxygenation. The more oil phase product, the more oxygen has been removed from sorbitol.

The conversion and selectivity were on the carbon basis, defined in following equations:

$$\text{Conversion} = \frac{\text{mol. of sorbitol consumed} \times 6}{\text{mol. of sorbitol input} \times 6} \times 100\%$$

$$S_{product} = \frac{\text{mol. of product generated} \times \text{carbon number}}{\text{mol of sorbitol consumed} \times 6} \times 100\%$$

TABLE 3

Summary of sorbitol conversion and product selectivities with the Pt—Nb/ZrCr catalyst

| Stage | Components | 265° C.- 1 h$^{-1}$ | 265° C.- 0.25 h$^{-1}$ | 280° C.- 1 h$^{-1}$ | 280° C.- 1 h$^{-1}$- lowH |
|---|---|---|---|---|---|
| Conversion | | 93 | 99.6 | 99.8 | 97.5 |
| Gas: | | 16.00 | 18.00 | 14.00 | 14.00 |
| | hexane | <1 | 4.00 | 1.50 | 1.60 |
| | CO$_2$ | 11.50 | 7.00 | 9.00 | 9.00 |
| Acids: | | 5.36 | 0.30 | 2.03 | 2.58 |
| | 1-pentanoic acid | 0.29 | 0.06 | 0.67 | 0.31 |
| | 1-hexanoic acid | 0.63 | 0.14 | 0.00 | 1.24 |
| Alcohols: | | 11.38 | 31.38 | 21.66 | 11.21 |
| | ethanol | 1.12 | 1.07 | 1.18 | 1.00 |
| | 1-propanol | 0.91 | 1.45 | 1.22 | 1.00 |
| | 1-butanol | 1.51 | 2.30 | 2.01 | 1.41 |
| | 1-pentanol | 2.15 | 4.73 | 1.93 | 2.17 |
| | 1-hexanol | 1.11 | 4.87 | 1.65 | 1.47 |
| | cyclopentane-methanol | 0.32 | 0.65 | 0.72 | 0.22 |

TABLE 3-continued

Summary of sorbitol conversion and product selectivities with the Pt—Nb/ZrCr catalyst

| Stage | Components | Reaction | | | |
|---|---|---|---|---|---|
| | | 265° C.-1 h$^{-1}$ | 265° C.-0.25 h$^{-1}$ | 280° C.-1 h$^{-1}$ | 280° C.-1 h$^{-1}$-lowH |
| Ketones: | | 1.72 | 3.41 | 2.91 | 1.96 |
| | 2-butanone | 0.00 | 0.00 | 0.00 | 0.08 |
| | 2-hexanone | 0.17 | 0.15 | 0.42 | 0.35 |
| | 3-hexanone | 0.28 | 0.14 | 0.49 | 0.63 |
| | methyl-cyclopentanone | 0.00 | 0.00 | 0.00 | 0.00 |
| Heterocycles: | | 17.16 | 19.60 | 24.88 | 18.96 |
| | dimethyl THF | 0.96 | 1.32 | 1.38 | 1.48 |
| | THF | 0.38 | 0.26 | 0.47 | 0.37 |
| | THP | 0.63 | 1.52 | 1.14 | 0.59 |
| | Methyl THP | 1.63 | 6.40 | 2.93 | 1.79 |
| | THP-2-methanol | 5.64 | 4.88 | 4.38 | 3.33 |
| Esters | | 0.00 | 1.15 | 1.52 | 2.02 |
| Diols and diones | | 16.54 | 1.47 | 9.41 | 15.13 |
| HPLC | | 10.00 | 0.60 | 1.50 | 6.00 |
| aqueous cut % | | 26.54 | 2.07 | 10.91 | 21.13 |
| Monofunctional Compounds | | 35.62 | 55.84 | 53.00 | 36.73 |
| Total carbon | | 78.16 | 75.91 | 77.91 | 71.86 |

Both catalysts showed good activity for sorbitol HDO reaction without obvious deactivation during total 703 h reaction. The product selectivities varied with reaction temperature and liquid hour space velocity (LHSV). The major monofunctional oxygenates (MO) produced by this process were a mixture of alcohols and heterocycles along with a small amount of ketones and carboxylic acids. Increase in the reaction temperature and decrease in the LHSV led to increased carbon selectivity (Cs) to MOs and the reduced Cs to aqueous cut. The hydrogen gas hour space velocity (GHSV) also changed the deoxygenation efficiency over these two catalysts. A lower hydrogen GHSV led to a reduced oil phase product. For example, in the operation stage 4, the decrease of GHSV from 800 h$^{-1}$ to 200 h$^{-1}$ caused the significant reduction of MOs selectivity from 53% to 36.7% and increased aqueous cut from 10.9% to 21.1% over the Pt—Nb/ZrCr catalyst. Compared to Pt/ZrCr, the niobium promoted Pt—Nb/ZrCr catalyst showed enhanced activity with high conversion and high selectivity to MOs operating at the same conditions. The oil phase collected from sorbitol HDO over Pt—Nb/ZrCr was generally much more transparent and clearer than from Pt/ZrCr.

TABLE 4

Summary of sorbitol conversion and product selectivity with the Pt/ZrCr catalyst

| Stage | Components | Reaction | | | |
|---|---|---|---|---|---|
| | | 265° C.-1 h$^{-1}$ | 265° C.-0.25 h$^{-1}$ | 280° C.-1 h$^{-1}$ | 280° C.-1 h$^{-1}$-lowH |
| Conversion | | 86 | 99.6 | 98.5 | 94 |
| Gas: | | 12.50 | 9.00 | 8.50 | 6.00 |
| | hexane | 0.70 | 0.80 | 0.70 | 0.70 |
| | CO2 | 10.50 | 6.00 | 6.20 | 4.00 |
| Acids: | | 2.18 | 0.66 | 2.26 | 2.03 |
| | 1-pentanoic acid | 0.17 | 0.18 | 0.19 | 0.04 |
| | 1-hexanoic acid | 0.67 | 0.39 | 0.76 | 0.84 |
| Alcohols: | | 7.62 | 16.12 | 10.36 | 6.80 |
| | ethanol | 0.77 | 1.23 | 1.02 | 0.83 |
| | 1-propanol | 0.56 | 0.95 | 0.78 | 0.82 |
| | 1-butanol | 0.60 | 1.34 | 0.88 | 0.73 |
| | 1-pentanol | 0.46 | 2.84 | 1.86 | 1.06 |
| | 1-hexanol | 0.86 | 1.82 | 1.11 | 0.81 |
| | cyclopentane-methanol | 0.53 | 0.60 | 0.57 | 0.49 |
| Ketones: | | 0.99 | 1.60 | 1.66 | 1.61 |
| | 2-butanone | 0.00 | 0.00 | 0.20 | 0.31 |
| | 2-hexanone | 0.08 | 0.04 | 0.24 | 0.28 |
| | 3-hexanone | 0.20 | 0.04 | 0.32 | 0.36 |
| | methyl-cyclopentanone | 0.00 | 0.00 | 0.00 | 0.00 |

TABLE 4-continued

Summary of sorbitol conversion and product selectivity with the Pt/ZrCr catalyst

| Stage | Components | Reaction | | | |
|---|---|---|---|---|---|
| | | 265° C.-1 h$^{-1}$ | 265° C.-0.25 h$^{-1}$ | 280° C.-1 h$^{-1}$ | 280° C.-1 h$^{-1}$-lowH |
| Heterocycles: | | 15.14 | 21.60 | 13.78 | 8.98 |
| | dimethyl THF | 1.06 | 0.66 | 0.68 | 0.50 |
| | THF | 0.36 | 0.17 | 0.19 | 0.27 |
| | THP | 0.39 | 0.04 | 0.02 | 0.01 |
| | Methyl THP | 0.18 | 2.14 | 0.96 | 0.66 |
| | THP-2-methanol | 0.74 | 3.86 | 2.38 | 2.10 |
| Ester | | 0.00 | 0.42 | 0.26 | 0.09 |
| Diols and diones | | 21.12 | 16.67 | 15.84 | 16.78 |
| HPLC | | 14.00 | 0.80 | 10.00 | 9.00 |
| aqueous cut % | | 35.12 | 17.47 | 25.84 | 25.78 |
| Monofunctional Oxgenates | | 25.93 | 40.40 | 28.32 | 19.51 |
| Total carbon | | 73.55 | 66.87 | 62.66 | 51.29 |

Example 9

Sorbitol HDO Over Pt—Mo/ZrCr and Pt—W/ZrCr

The Pt—Mo/ZrCr and Pt—W/ZrCr catalysts were evaluated in parallel fixed-bed reactors. The catalyst loading was 15 mL with stainless steel (SS) ball dilution to 30 mL. The feed solution contains about 34.5 wt. % sorbitol. The tests were conducted at 100 bar hydrogen pressure. The catalysts were activated in-situ before test. The testing conditions were summarized in table 5 and 6.

TABLE 5

Summary of the testing conditions for sorbitol HDO with Pt—W/ZrCr catalyst

| Stage | Reaction T (° C.) | Pressure (bar) | LHSV (h$^{-1}$)/ Pump rate (mL/min) | H$_2$ flow (mL/min)/ GHSV(h$^{-1}$) | Effluent flow (mL/min) | Liquid product collecting time (h) | Oil product (mL) | TOS (h) |
|---|---|---|---|---|---|---|---|---|
| 1 | 265 | 100 | 0.25/(0.063) | 200 (800 h$^{-1}$) | 150 | 125 | — | 196 |
| 2 | 265 | 100 | 2/(0.5) | 300 (1200 h$^{-1}$) | 230 | 71 | 62 | 117 |
| 3 | 245 | 100 | 1/(0.25) | 300 (1200 h$^{-1}$) | 240 | 75 | 22 | 100 |

TABLE 6

Summary of the testing conditions for sorbitol HDO with Pt—Mo/ZrCr catalyst

| Stage | Reaction T (° C.) | Pressure (bar) | LHSV (h$^{-1}$)/ Pump rate (mL/min) | H$_2$ flow (mL/min)/ GHSV(h$^{-1}$) | Effluent flow (mL/min) | Liquid product collecting time (h) | Oil product (mL) | TOS (h) |
|---|---|---|---|---|---|---|---|---|
| 1 | 265 | 100 | 0.25/(0.063) | 200 (800 h$^{-1}$) | 136 | 125 | 32 | 196 |
| 2 | 265 | 100 | 2/(0.5) | 300 (1200 h$^{-1}$) | 230 | — | — | 48 |

The sampling and analytic methods followed the same procedures as described in Example 8.

The Pt—Mo/ZrCr catalyst showed less activity compared to Nb and W promoted catalysts and non-promoted catalysts under the same operating conditions at 265° C. with LHSV of 0.25 h$^{-1}$. Sorbitol conversion was 87.9% over Pt—Mo/ZrCr compared to a 99.6% over Pt/ZrCr. However, the catalyst showed high selectivity to 1-hexanol and hexane with Cs of 12.3% and 16.3%, respectively. The carbon selectivity to heterocycles was significantly reduced to 12.3% compared to 21.6% over Pt/ZrCr. No CO$_2$ product was observed in gas products over the Pt—Mo/ZrCr catalyst.

Pt—W/ZrCr showed superior hydrodeoxygenation activity to Pt—Nb/ZrCr. At 265° C. with LHSV of 0.25$^{-1}$ and GHSV of 800 h$^{-1}$, Pt—W/ZrCr converted 99.5% sorbitol into hexane (55% carbon selectivity) and balanced with other light hydrocarbon gas. Only a small amount of hetero-cylics (Cs 0.33%) was detected in aqueous phase product. Further increase in the LHSV to 2 h$^{-1}$ and GHSV to 1200 h$^{-1}$ at 265° C., Pt—W/ZrCr yielded a good amount of oil phase product, while no phase separation was seen over Pt—Nb/ZrCr under similar operating conditions with a lower LHSV of 1 h$^{-1}$.

Further decrease the reaction temperature to 245° C. with LHSV of 1 h$^{-1}$, the conversion of sorbitol was lowered to 62.4% over Pt—W/ZrCr and the Cs to MOs was about 58%.

Figure 5:
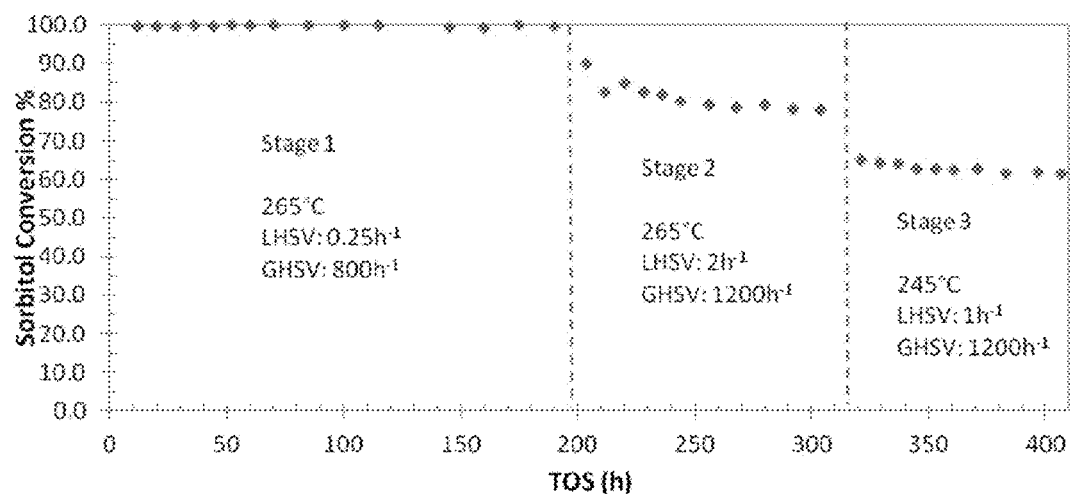
FIG. 5 shows time-on-stream sorbitol conversion with the Pt—W/ZrCr catalyst for sorbitol HDO.
Figure 6:
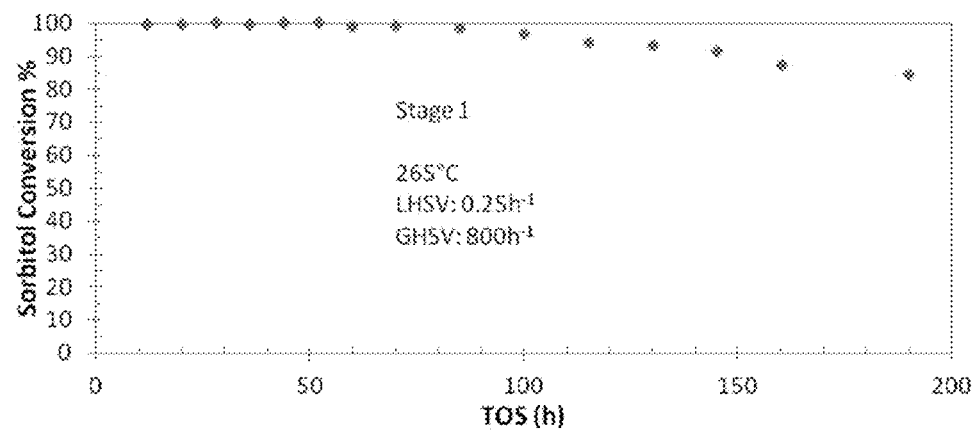
FIG. 6 shows time-on-stream sorbitol conversion with the Pt—Mo/ZrCr catalyst for sorbitol HDO.

Pt—W/ZrCr experienced about total 410 h TOS reaction without obvious deactivation observed. Pt—Mo/ZrCr started to deactivate at the first stage of the reaction. The reaction was shut down at the second stage after about 48 h. See FIGS. 5 and 6 which show time-on-stream sorbitol conversion over the Pt—W/ZrCr and Pt—Mo/ZrCr catalysts for sorbitol HDO. Pt—W/ZrCr showed good catalytic stability, while Pt—Mo/ZrCr started to deactivation after about 80 hours.

TABLE 7

Summary of sorbitol conversion and product selectivities with the Pt—W/ZrCr and Pt—Mo/ZrCr catalysts

| | | Catalyst | | | |
| --- | --- | --- | --- | --- | --- |
| | | Pt—W/ZrCr | | | Pt—Mo/ZrCr |
| Stage | Components | 265° C.-0.25 h$^{-1}$ | 265° C.-2 h$^{-1}$ | 245° C.-1 h$^{-1}$ | 265° C.-0.25 h$^{-1}$ |
| Conversion | | 99.5 | 79.6 | 62.4 | 87.94 |
| Gas: | | 85.00 | 16.00 | 10.00 | 20.00 |
| | hexane | 55.00 | 5.00 | 3.70 | 16.29 |
| | $CO_2$ | 0.50 | 5.00 | 2.80 | 0.00 |
| Acids: | | — | 1.82 | 4.89 | 3.00 |
| | pentanoic acid | — | 0.30 | 0.21 | 0.00 |
| | hexanoic acid | — | 1.33 | 0.84 | 1.38 |
| Alcohols: | | — | 16.32 | 26.18 | 22.06 |
| | ethanol | — | 0.48 | 0.63 | 0.19 |
| | propanol | — | 1.05 | 1.26 | 0.30 |
| | butanol | — | 1.40 | 1.61 | 0.91 |
| | pentanol | — | 2.43 | 3.31 | 0.85 |
| | hexanol | — | 4.32 | 10.44 | 12.28 |
| | cyclopentane-methanol | — | 0.53 | 0.81 | 1.11 |
| Ketones: | | — | 3.44 | 4.30 | 3.21 |
| | 2-butanone | — | 0.28 | 0.00 | 0.12 |
| | 2-hexanone | — | 1.11 | 0.84 | 0.51 |
| | 3-hexanone | — | 0.74 | 1.04 | 0.38 |
| | methyl-cyclopentanone | — | 0.00 | 0.00 | 0.00 |
| Heterocycles: | | 0.33 | 15.96 | 22.57 | 12.27 |
| | dimethyl THF | — | 2.31 | 3.36 | 1.38 |
| | THF | — | 0.76 | 0.79 | 0.56 |
| | THP | 0.14 | 0.68 | 0.75 | 0.98 |
| | Methyl THP | 0.19 | 2.54 | 3.75 | 1.71 |
| | THP-2-methanol | — | 2.51 | 2.20 | 1.45 |
| Ester | | — | 0.00 | 0.00 | 1.95 |
| Diols and diones | | — | 9.35 | 17.28 | 0.96 |
| HPLC aqueous cut % | | — | 16.40 | 17.50 | 8.94 |
| | | 0.00 | 25.75 | 34.78 | 9.90 |
| Monofunctional Compounds | | 0.33 | 37.54 | 57.94 | 42.49 |
| Total Carbon | | 85.33 | 79.29 | 102.72 | 72.39 |

Example 10

Catalyst Stability

Fresh and spent HDO catalysts were characterized by crush strength, element analysis, and carbon analysis (spent catalysts only). The results are shown in table 8. The HDO catalysts showed both excellent mechanical stability and chemical stability. No obvious change of crush strength observed over the fresh and spent HDO catalysts. No obvious leaching of promoters and active precious metals were observed. The deactivation of Pt—Mo/ZrCr might be due to the deposit carbon species which included coke and other forms of organic carbons.

TABLE 8

List of the crush strength, the composition of the fresh and spent catalyst as well as the carbon content in the spent catalysts

| Catalyst | Total HDO TOS (h) | Fresh Crush Strength (lb/mm) | Spent Crush Strength (lb/mm) | Fresh Composition wt. % | Spent Composition wt. % | Carbon content in spent catalyst % |
| --- | --- | --- | --- | --- | --- | --- |
| Pt/ZrCr | 703 | — | — | Pt: 1.67; Zr: 65.0 | Pt: 1.82; Zr: 64.8 | — |
| Pt—Nb/ZrCr | 703 | 2.5 | 2.4 | Pt: 1.93; Nb: 4.38; Zr: 60.4 | Pt: 1.84; Nb: 4.50; Zr: 61.8 | 1.5 |
| Pt—Mo/ZrCr | 244 | 2.2 | 2.6 | Pt: 1.15; Mo: 8.4; Zr: 59.6 | Pt: 0.957; Mo: 8.4; Zr: 57.9 | 10.4 |
| Pt—W/ZrCr | 413 | 4.1 | 4.0 | Pt: 1.13; W: 9.99; Zr: 60.0 | Pt: 1.03; W: 9.97; Zr: 59.7 | 2.9 |

Example 11

Preparation of HDO Catalyst Pt—Nb/ZrCr (Pt: 0.5 wt. %, Nb: 10 wt. %)

The catalyst was made by the same procedure in Example 5 except one quarter of the amount of Pt was used.

Example 12

Preparation of HDO Catalyst Pt—Nb/ZrCr (Pt: 0.5 wt. %, Nb: 5 wt. %)

The catalyst was made by the same procedure in Example 11 except one half of the amount of Nb was used to make the support.

Example 13

Preparation of HDO Catalyst Pt—Nb/ZrCr (Pt: 0.5 wt. %, Nb: 10 wt. %)

The catalyst was made by mixing 10 wt. % niobic acid (HY340, Companphia Brasileira de Metalurgia e Mineração (CBMM) with properly dried ZrCr precipitate (L.O.I of 65%). The support was extruded into 2 mm diameter extrudates followed by calcination at 450° C. for 2 h. They were then sized in the range of 10 to 14 mesh before loading Pt metal. The Pt metal was loaded by the procedure in Example 5 except one quarter of the amount of Pt was used.

Example 14

HDO of Fatty Acid

The Example 5 catalyst was evaluated for fatty acid HDO in a batch reactor at 400° C. at 100 bar hydrogen pressure. The catalyst loading was 4 mL, approximately 5 g. Nonanoic acid (NA) was diluted in dodecane. About 100 mL 8 wt. % NA solution was fed into reactor after catalyst activation at 250° C. for 4 h. The reactor was then pressurized by hydrogen and heated to 400° C. The complete conversion of NA was observed immediately after the reactor was heated up to 400° C. (90 min). The reaction was stopped after 1 h. The spent catalyst was recycled and washed with excess methanol. This catalyst was re-activated at the same reduction condition and evaluated by three successive NA HDO reactions at 280° C. for 5 to 6 h at 100 bar hydrogen pressure. The test was designed to evaluate the activity and the stability of the catalyst for fatty acid conversion. In between of each test, 60 mL dodecane and 8 mL NA was injected into the reactor to maintain the liquid level (due to sampling) and the NA concentration at the beginning of each run. The reaction was conducted in a closed system, except for small amount of hydrogen was introduced to maintain reactor pressure after each liquid sampling. The gas was sampled after reactor was cooled to room temperature in each run.

The NA conversion and the product yield was calculated based on the molar concentration of each component in the liquid sample, assuming that no volume change during the reaction. The NA and the products were analyzed by GC/MS. Nonane was the final reaction product. Nonanol and another unknown reaction intermediate (probably nonanoic acid nonyl ester) were detected during the reaction. The conversion and product yield calculations were based on the following equations:

$$\text{Conversion} = \frac{C_{NA,initial} - C_{NA}}{C_{NA,initial}} \times 100\%$$

$$\text{Yield} = \frac{C_{product} - C_{product\ initial}}{C_{NA,initial}}$$

TABLE 9

Catalytic performance of nonanoic acid HDO over the Example 5 catalyst. All the data below were recorded at 5 h reaction at 280° C. under 100 bar hydrogen pressure.

| Reaction Cycle | Run 1 | Run 2 | Run 3 |
|---|---|---|---|
| Initial NA concentration wt. % | 8 | 6.7 | 5.4 |
| NA conversion % | 100 | 100 | 100 |
| Nonane yield % | 72 | 62 | 59 |
| Nonanol yield % | — | 3.2 | 12 |

The Example 5 catalyst maintained high activity in each run with 100% conversion of nonanoic acid after 5 h reaction. Methane was the predominate gas product. At the same reaction time of 5 h, the yield of nonane decreased from 72% at the first run to 59% at the third run. Meanwhile, the nonanol yield increased from 0 to 3.2% at the second run and 12% at the third run. These indicated that the Example 5 catalyst might experience a certain degree of deactivation. The carbon analysis showed that the spent catalyst contains about 1.1 wt. % carbon.

Example 15

HDO of FAME with the Example 5 Catalyst

Fatty acid methyl ester (FAME) was obtained from transesterification of algae oil. The HDO test was conducted in a semi-batch reactor with the excess gas phase pressure released by a back pressure regular (BPR). The catalyst loading was 8 mL, approximate 10 g. The FAME feed was 100 mL, approximate 90 g. The catalyst was activated before introduction of liquid feed. The reactor system was next pressurized to 100 bar hydrogen pressure. Then, the reactor outlet was closed. The reactor was heated with a 5 K/min heating ramp rate to reaction temperature of 400° C. The consumption of hydrogen during the heating process in the temperature range from 120 to 340° C. was observed due to the hydrogenation of the unsaturated carbon bonds in FAME. The reaction was timed after the reactor temperature reached to 400° C. and the reactor gas outlet was re-open in order to release the excess pressure from reaction. The test was maintained at 400° C. at 100 bar hydrogen pressure for total 2 h. The total volume of the released gas was measured by a wet testing meter. The gas sample was collected from reactor after the reactor was cooled to less than 50° C. The liquid product in reactor was analyzed by GC/MS after cooling to room temperature.

The GC/MS was calibrated by FAME standard (C8-C24, Sigma Aldrich) and alkanes standard (C8-C20 and C21 to C40, Sigma Aldrich). The response of the fatty acid was assumed to be the same. In a typical analysis, 0.1 mL of the collected liquid sample was diluted to 10 mL by cyclohexane. In some cases, the liquid products have low cloud point (wax at room temperature). The samples need to be heated slightly in order to measure 0.1 mL liquid product for analysis.

The conversion and selectivity are on the carbon basis, defined in following equations:

$$\text{Conversion} = \left(1 - \frac{\text{total mol. of } FAME \text{ carbon in liquid product}}{\text{mol. of } FAME \text{ carbon in feed}}\right) \times 100\%$$

$$Yield_{HC} = \frac{\text{mol. of carbon in } HC \text{ product}}{\text{mol. of } FAME \text{ carbon input}} \times 100\%$$

$$\text{Carbon Distribution} = \frac{\text{mol. of carbon in each components}}{\text{the total mol. of carbon}} \times 100\%$$

Figure 7:
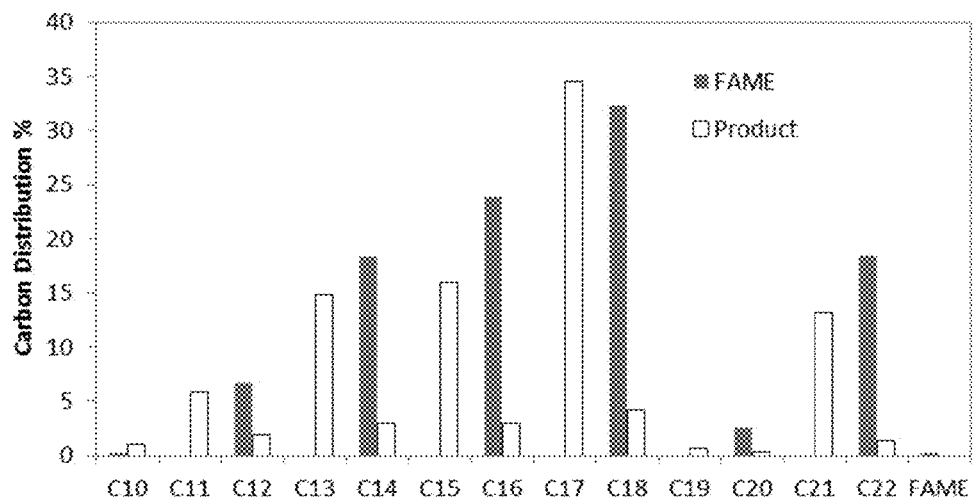
FIG. 7 shows the carbon distribution for FAME feed and the straight chain hydrocarbons in products with the Example 5 catalyst for FAME HDO at 400° C. for 2 h reaction.

The Example 5 catalyst showed 99.7% conversion of FAME with the straight chain hydrocarbon yield of 90.1% and the gas product yield of 7.7%. The gas product mainly contained methane, CO, and $CO_2$ with carbon distribution in gas phase of 30%, 23% and 34%, respectively. According to the carbon distribution shown in FIG. 7, the hydrocarbon product was produced mainly through decarbonylation/decarboxylation reaction. The reaction pathway for hydrogenation/dehydration/hydrogenation was the minor reaction pathway. Cracking is another possible reaction pathway.

Example 16

HDO of FAME with the Example 11 Catalyst

Figure 8:
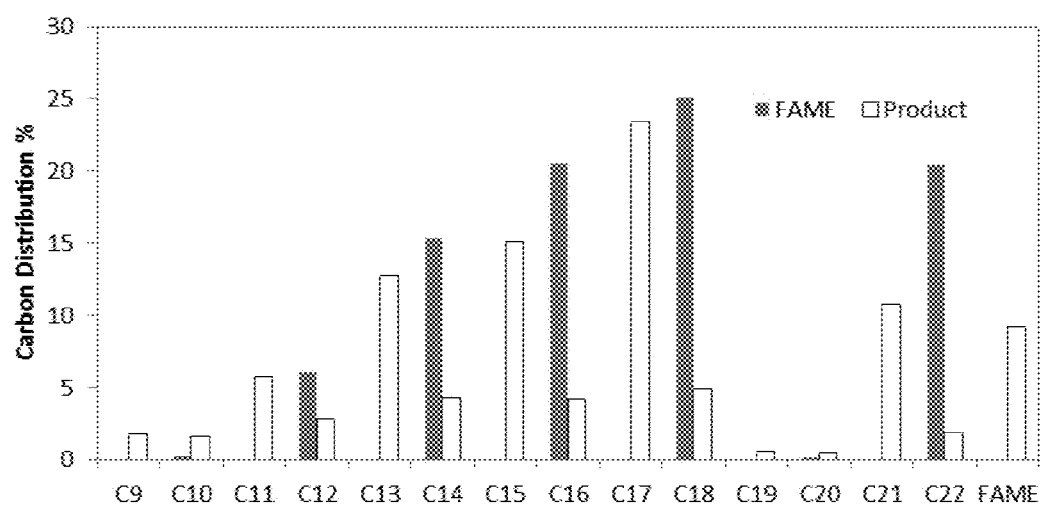
FIG. 8 shows the carbon distribution for FAME feed and products with the Example 11 catalyst for FAME HDO at 400° C. for 2 h reaction.

The test followed the exactly same procedure as described in Example 15 except used the Example 11 catalyst. The catalyst showed 95% conversion of FAME with the straight chain hydrocarbon yield of 49.2% and the gas product yield of 5.2%. The gas product mainly contained methane, CO, and $CO_2$ with carbon distribution in gas phase of 42%, 25% and 15%, respectively. The carbon distributions of FAME and product were shown in FIG. 8.

Example 17

HDO of FAME with the Example 12 Catalyst

Figure 9:
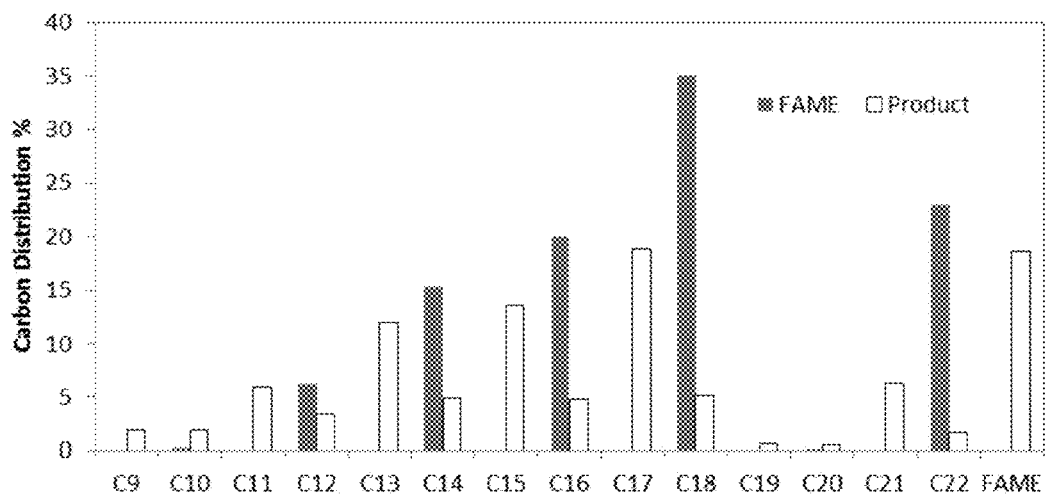
FIG. 9 shows the carbon distribution for FAME feed and products with the Example 12 catalyst for FAME HDO at 400° C. for 2 h reaction.

The test followed the exactly same procedure as described in Example 15 except used the Example 12 catalyst. The catalyst showed 91% conversion of FAME with the straight chain hydrocarbon yield of 39.4% and the gas product yield of 5.7%. The gas product mainly contained methane, pentane, and CO with carbon distribution in gas phase of 32%, 22% and 31%, respectively. The carbon distributions of FAME and product were shown in FIG. 9.

Example 18

HDO of FAME with the Example 13 Catalyst

Figure 10:
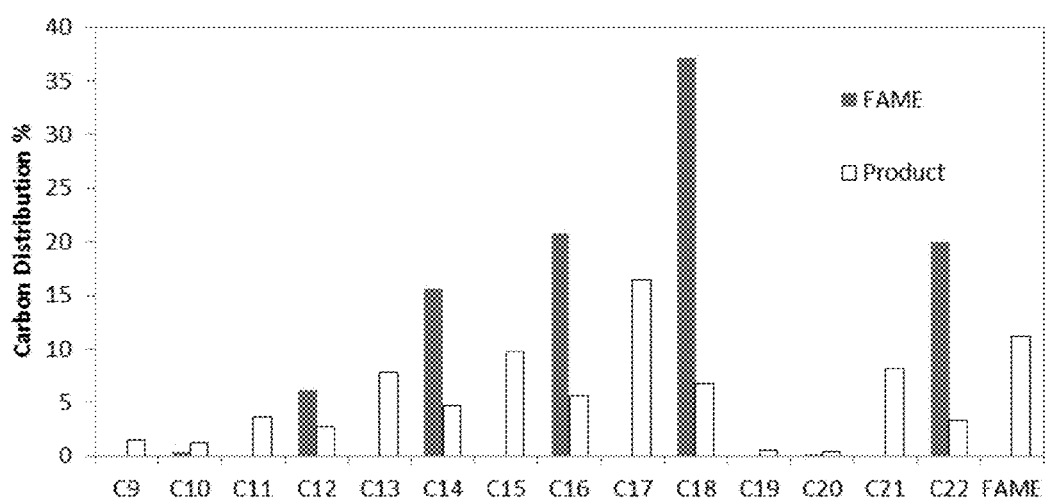
FIG. 10 shows the carbon distribution for FAME feed and products with the Example 13 catalyst for FAME HDO at 400° C. for 2 h reaction.

The test followed the exactly same procedure as described in Example 15 except used the Example 13 catalyst. The catalyst showed 99.5% conversion of FAME with the straight chain hydrocarbon yield of 58.5% and the gas product yield of 5.2%. The gas product mainly contained methane, CO, and $CO_2$ with carbon distribution in gas phase of 39.6%, 8.2% and 40.5%, respectively. The carbon distributions of FAME and product were shown in FIG. 10.

Example 19

Comparison Test

The commercial HDmax200 catalyst (CoO: 3-5%; $MoO_3$: 13-21%; $Al_2O_3$: balance) was tested for HDO of FAME. The catalyst was sized to 10-14 mesh before use. The catalyst loading is about 10 mL, 7.79 g. The catalyst was activated in a 166 mL/min hydrogen flow at 500° C. for 4 h with a heating ramp rate of 2 K/min before reaction. The FAME feed was 120 mL. The HDmax200 was tested at 380° C. for 4 h under 100 bar hydrogen pressure. HDmax200 showed 93.5%% conversion of FAME with the straight chain hydrocarbon yield of 14.9%. The liquid product also contained fatty acids with carbon yield of 13.2%, coke and other unknown products. Methane was the predominate gas product.

What is claimed is:

1. A hydrodeoxygenation catalyst comprising a metal catalyst, an acid promoter, and a support; wherein the metal catalyst is selected from platinum, palladium, or mixtures thereof; wherein the acid promoter comprises niobium; and wherein the support is a chromium-promoted zirconium material.

2. The hydrodeoxygenation catalyst of claim 1, wherein the acid promoter additionally comprises tungsten, molybdenum, cerium, manganese, vanadium, rhenium, or tantalum.

3. The hydrodeoxygenation catalyst of claim 2, wherein the acid promoter additionally comprises tungsten, or molybdenum.

4. The hydrodeoxygenation catalyst of claim 2, wherein the metal catalyst is about 0.01% to about 20% by weight of the hydrodeoxygenation catalyst.

5. The hydrodeoxygenation catalyst of claim 2, wherein the chromium-promoted zirconium material is formed by calcination at a temperature about 300° C. or more.

6. A hydrodeoxygenation process comprising mixing an aqueous solution comprising a sugar or sugar alcohol with a hydrodeoxygenation catalyst in a hydrogen atmosphere above atmospheric pressure; wherein the hydrodeoxygenation catalyst comprising a metal catalyst, an acid promoter, and a support; wherein the metal catalyst is selected from platinum, palladium, or mixtures thereof; wherein the acid promoter comprises niobium; and wherein the support is a chromium-promoted zirconium material.

7. The hydrodeoxygenation process of claim 6, wherein the acid promoter additionally comprises tungsten, or molybdenum.

8. The hydrodeoxygenation process of claim 6, wherein the hydrogen atmosphere has a pressure of at least 25 bar.

9. The hydrodeoxygenation process of claim 6, wherein the temperature is from about 220° C. to about 300° C.

10. A hydrodeoxygenation process comprising mixing fatty acid methyl esters, triglycerols, pyrolysis oil, or lignin, with a hydrodeoxygenation catalyst in a hydrogen atmosphere above atmospheric pressure; wherein the hydrodeoxygenation catalyst comprises a metal catalyst, an acid promoter, and a support; wherein the metal catalyst is selected from platinum, palladium, or mixtures thereof; wherein the acid promoter comprises niobium; and wherein the support is a chromium-promoted zirconium material.

11. The hydrodeoxygenation process of claim 10, wherein the acid promoter additionally comprises tungsten, molybdenum, cerium, manganese, vanadium, rhenium, or tantalum.

12. The hydrodeoxygenation process of claim 10, wherein the hydrodeoxygenation catalyst comprises about 0.01% by weight to about 20% by weight of the metal catalyst.

13. The hydrodeoxygenation process of claim 11, wherein the acid promoter is about 0.1% to about 99% by weight of the support.

14. The hydrodeoxygenation process of claim 10, wherein the temperature is from about 250° C. to about 400° C.

* * * * *